Patented Sept. 18, 1945

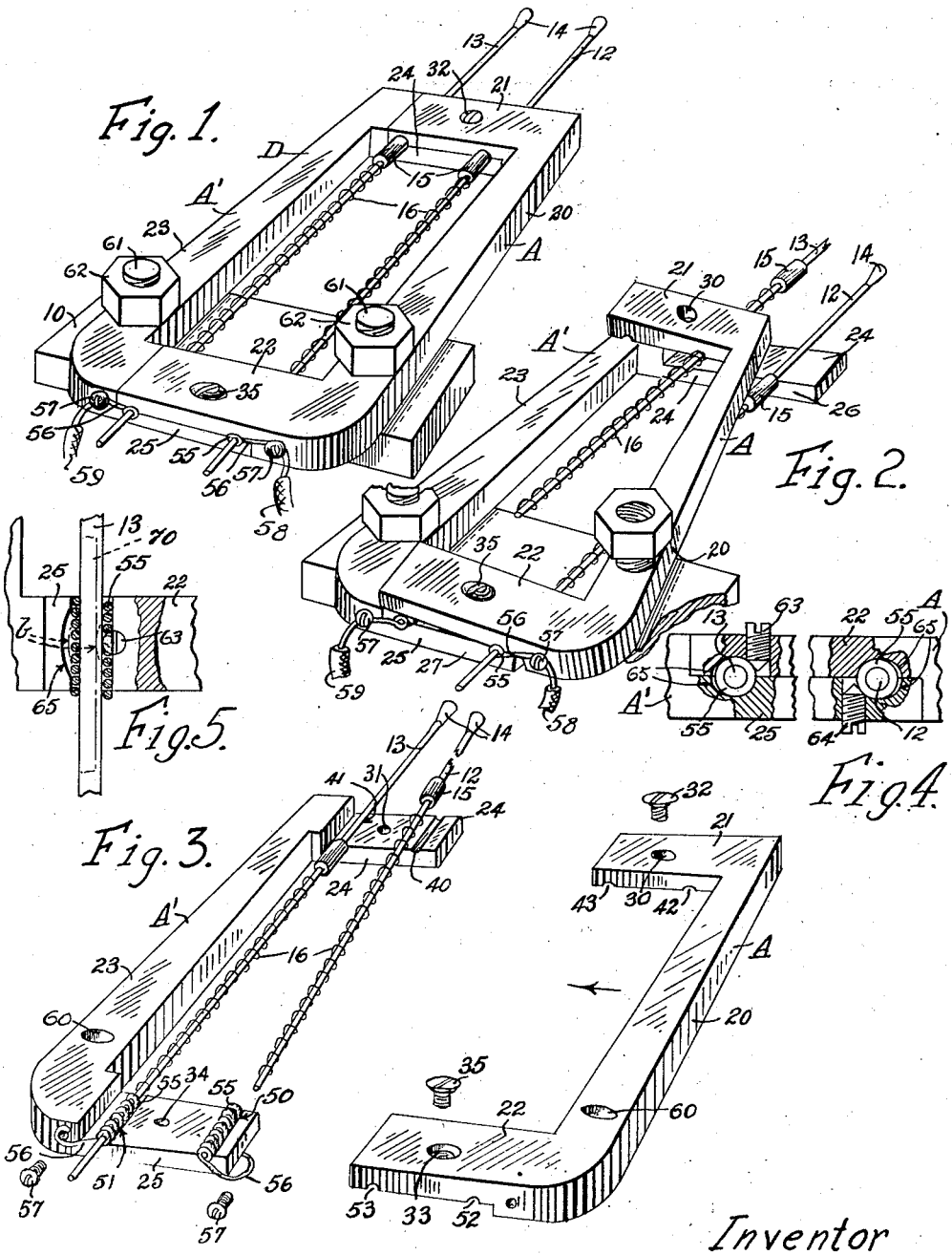

2,384,979

UNITED STATES PATENT OFFICE 2,384,979

ELECTRICAL WEFT DETECTOR FOR LOOMS

Richard G. Turner, Worcester, Mass., assignor to Crompton & Knowles Loom Works, Worcester, Mass., a corporation of Massachusetts Application July 22, 1944, Serial No. 546,136

13 Claims. (Cl. 139—273)

This invention relates to improvements in weft detectors for looms and it is the general object of the invention to provide a detector so constructed as to facilitate assembly and also removal of the detector elements.

Certain types of electrical weft detectors employ two slidable rods insulated from each other and positioned so that they can be electrically connected by a metallic ferrule on the bobbin. In such detectors the sliding detector elements are usually held in rear position by light springs and are mounted so that they can slide backwardly and forwardly during a detecting operation. The external loom controlling circuit is ordinarily connected to the slide bearings for the detector elements and when the rear ends of the elements are electrically connected the circuit is completed through the elements and their slide bearings.

It has been customary in the past to form the carrier or casing for the sliding detector elements in one piece and make the slide bearings separate from the casing so that the detector rods or elements can be placed in position in the supporting base, after which the bearings are fastened or otherwise attached to the base. Such bases are ordinarily expensive to make and removal of a defective detector rod and its replacement by a straight rod usually requires considerable time.

It is an important object of my present invention to make the detector base in two parts and construct them in such a manner that they can be readily separated for the removal of the detector rod without manipulating the slide bearings or disturbing their connections with the external circuit.

It is another object of my present invention to form the detector base of two similarly formed parts so constructed that when connected together they form an assembled unit with properly aligned slide guides for both the front and back ends of the detector rods.

It is a still further object of my invention to make the slide bearing of a coil spring one end of which leads to a binding post having connection with the external loom controlling circuit. When using the coil spring slide bearings I may modify their construction in such a way as to permit lateral deflection of them for the purpose of establishing a close sliding fit with their detector rods or elements.

With these and other objects in view which will appear as the description proceeds, my invention resides in the combination and arrangement of parts hereinafter described and set forth.

In the accompanying drawing, wherein two forms of the invention are shown,

Fig. 1 is a perspective view of a weft detector made according to my present invention and assembled in readiness for use in a loom, Fig. 2 is a view similar to Fig. 1 but shows the manner in which one of the base sections can be moved with respect to the other to facilitate the removal of a defective detector rod or element, the supporting structure being indicated in dot and dash lines, Fig. 3 is a perspective view indicating the manner of assembling the detector, Fig. 4 is a detailed front elevation, parts being in section, showing the modification wherein the coil spring slide bearing can be deflected laterally, and Fig. 5 is a plan view partly in section of the left half of Fig. 4 indicating the manner in which the modification operates.

Weft detectors of the general type to which my invention relates are well understood and it is not thought necessary to illustrate the shuttle, bobbin, or other loom parts with which the detector cooperates. It is thought sufficient to indicate a supporting stand 10 which may be fixed with respect to the loom and serve as a support for the detector designated generally at D. An example of the general type of detector set forth herein is shown for instance in Payne Patent No. 1,924,197.

As shown in Fig. 1, the preferred form of the invention has right and left detector elements or rods 12 and 13, respectively, each having a detector head 14 at the rear end thereof for engagement with the bobbin not shown. Each rod is provided with a shoulder 15 and the forward part of each rod is surrounded by a light compression spring 16 the normal function of which is to urge the corresponding rod rearwardly.

The detector comprises two base forming elements which are preferably similar, the right and left hand elements being designated, respectively, at A and A'. Element A is provided with a side bar 20 and a rear arm 21 projecting laterally to the left therefrom, while the front part of the side bar 20 has extending to the left and laterally therefrom a front arm 22. In similar manner, element A' is provided with a side bar 23 having a rear lateral arm 24, projecting from the right thereof and a front lateral arm 25 also projecting to the right. The arms 21 and 24 are provided with aligned holes 30 and 31, respectively, for the reception of a holding screw 32, while arms 22 and 25 are provided respectively with aligned holes 33 and 34 for the reception of a front screw 35. The screws 32 and 35 are the means by which the two parts of the base are held together in the general form shown in Fig. 1, and are threaded into the bottom arms 24 and 25.

As shown in the left hand part of Fig. 3 the rear arm 24 is provided with two parallel semicircular spaced horizontal grooves 40 and 41, groove 40 being unoccupied in said figure. The under side of arm 21 is provided with similar grooves 42 and 43 the forward ends of which show in the right hand part of Fig. 3. The grooves of the two arms 21 and 24 are so related that when assembled as shown for instance in Fig. 1, the upper grooves align with the lower grooves to form cylindrical bearings in the two arms 21 and 24 extending axially of the base D for sliding engagement with the rear parts of the wires 12 and 13.

In similar manner, arm 25 is provided with grooves 50 and 51 substantially parallel to and preferably coaxial with the grooves 40 and 41. In like manner the under side of the arm 22 is provided with grooves 52 and 53 the forward ends of which show in the right part of Fig. 3. As in the case of the rear grooves, the forward grooves are so located that when the detector is assembled for use the grooves 50 to 53 form parallel bores coaxial with rods 12 and 13, but which are of somewhat larger diameter than the grooves 40 to 43.

Located in each of the front bores is a coil spring bearing 55, see Fig. 3. Each of these bearings is preferably formed of a closed coil spring which fits closely in its appropriate grooves between arms 22 and 25. Each spring 55 has a forward lateral extension 56 which may be caught under a binding post or screw 57, and the bearing springs can thus have electric connection with wires 58 and 59 forming part of an external loom controlling circuit not otherwise illustrated herein.

In assembling the matter thus far described the detector rod or wire 13 may have the forward end thereof passed through one of the light compression springs 16 and then slipped forwardly through the left hand spring bearing 55 which will be held in place by its binding screw 57. The wire 13 is then moved forward far enough to place the shoulder 15 thereof in front of the transverse arm 24 so that the rear part of the wire will fit into the semicircular groove 41. The normal tendency of the spring 16 of the wire 13 to expand will hold the latter temporarily in the position indicated in Fig. 3. The second detector rod or wire 12 is then manipulated in much the same manner as that described for wire 13, being passed through its spring 16 and then moved forwardly from the position indicated in Fig. 3 through its spring bearing 55 which may be temporarily held by the operator, since its end 56 is free. The rod 12 is then pushed forwardly until its shoulder 15 engages the front of arm 24 and then pressed into groove 40. This operation involves the detector wires, and light compression springs and the coil spring bearings as well as the detector base section or part A'.

The part A is now moved to the left from the position shown in Fig. 3 until the arms 21 or 22 fit over the arms 24 and 25, after which section A is pressed downwardly in position and secured to section A' by screws 32 and 35. The right hand binding screw 57 may then be inserted into the part A and end 56 of the right bearing spring 55 caught under it and electrical connection established between the right hand bearing 55 and wire 58. The detector D thus assembled is mounted on stand 10 in proper position for operation in the loom not shown. Wires 12 and 13 are thus yieldingly mounted for back and forth motion in the detector case and whenever the heads 14 are electrically connected the wires 58 and 59 will also be connected to operate the external circuit.

In order that the detector may be held on the support 10 each of the sections A and A' is provided with a vertical hole 60, see Fig. 3, through which a bolt 61 extends upwardly from the support 10. The assembled detector is held firmly on the support 10 by nuts 62 threaded down tightly on the bolts 61.

Fig. 2 illustrates an important advantage accruing from the use of my present invention. If it be assumed that the left hand wire 13 has become useless, as by breaking of the rear end thereof, it will not be necessary to effect complete disassembly of the detector in order to insert a new detector wire. The front screw 35 and right nut 62 can be loosened somewhat, and then the screw 32 backed off sufficiently to permit raising of the transverse arm 21 above the arm 24 in some such relationship as indicated in Fig. 2. When in this position the right hand detector rod or wire 12 will remain in position, and the rear end of the left hand rod or wire 13 can be raised slightly and slipped rearwardly out of the detector. A new detector rod can then be inserted through the spring 16 corresponding to the defective wire, after which the assembly is carried out in much the same manner as that already described. In this way the part A' can be kept bolted to the stand 10 and the part A need be loosened only sufficiently to permit a slight upward movement of the arm 21.

In the modified form of the invention set forth in Figs. 4 and 5 I utilize a feature inherent in the coil springs 55 which permits them to be deflected laterally. Due to inequalities in manufacture it may be that the wires 12 and 13 will not have a close fit with the interior of the coils of the spring bearings 55 and for this reason the detector may fail to indicate. In order to provide means for taking up any undue slack or misfit which may lead to a defective contact as just described, I thread into the forward arms 22 and 25 vertically movable screws 63 and 64, respectively. These screws are so located that when they are turned into their corresponding arms they will engage and deflect the associated spring 55. To permit this lateral deflection of the spring the grooves 50 to 53 may be bowed as at 65 on that side of the detector wire opposite the associated setting screw to receive the deflected parts of springs 55.

In using this modification the parts will be assembled as in Fig. 1 and then the wires 12 and 13 will be moved forwardly to compress their spring 16, after which each of the screws 63 and 64 will be turned sufficiently to deflect the corresponding spring bearing 55 enough to hold the associated detector rod in forward position. The screws 63 and 64 are then backed off just enough to permit a slight straightening of the axes of the spring bearings 55 until the springs 16 are able to move their detector wires rearwardly. Under these conditions assurance is given that each of the detector wires 12 and 13 will have proper sliding engagement with parts at least of the spring bearings 55 so that when indication is given in the usual manner the wires 58 and 59 will be electrically connected.

As an example of this feature of my invention, Fig. 5 shows an undersized detector rod 70 in dot and dash lines, and the left hand spring bearing 55 has been deflected to the left, see dot and dash lines b, sufficiently to cause good electric contact with rod 70.

From the foregoing it will be seen that I have provided a weft detector made of two similar component parts or sections which when assembled as already described form a base or framework in which the detector wires 12 and 13 can slide. The component parts have overlapping arms, as 21 and 24, and 22 and 25, provided with grooves which receive the rear parts of detector rods or wires 12 and 13 and also the bearing springs 55. Each of the component parts or elements A and A' has its own separate means for attachment to the stand 10, and for this reason the part A can be loosened or removed while part A' remains in place. Under these conditions the arms 24 and 25 serve as support means for the detector rods or members 12 and 13. Under normal operating conditions the arms 21 and 22 serve as guide means for the upper parts of the detector rods. Each part A and A' carries a binding screw for holding the laterally extending end 56 of one of the spring bearings 55. Furthermore, as set forth more particularly in Fig. 2, it is possible to effect a quick replacement of one of the detector wires without completely disassembling the detector and without disturbing the connections between the springs 55 and the wires 58 and 59 of the external circuit. Also, in the modified form of the invention it will be seen that means are provided for deflecting the normally straight axis of the resilient spring bearings 55 for the purpose of taking up any slack or improper fit between them and the rods 12 and 13.

Having thus described my invention it will be seen that changes and modifications may be made therein by those skilled in the art without departing from the spirit and scope of the invention and I do not wish to be limited to the details herein disclosed, but what I claim is:

1. In a weft detector base for a pair of slidable electric detector rods, a pair of detector base forming elements between which said detector rods extend, support means for said detector rods extending from one of said elements toward the other element, guide means extending from said other element toward said one element and over said support means, adjacent surfaces of said support and guide means being provided with grooves which receive the detector rods for sliding movement relatively to said elements, and means securing said elements together with the detector rods between said support and guide means.

2. In a weft detector base for a pair of slidable electric detector rods, a pair of similar base forming elements between which said detector rods extend, one element being inverted relatively to the other element, means extending from each of said elements toward the other element, the means on one element being over the detector rods and the other means on the other element being under the detector rods, adjacent faces of said means and other means having provision for guiding the rods for sliding movement, and means securing said elements together with said means and other means in guiding relation relatively to said detector rods.

3. In a weft detector base for a pair of slidable electric detector rods, a pair of similar detector base forming elements each having a side bar, one of said elements being inverted relatively to the other element, support means extending from one of said side bars under said detector rods toward the other side bar, guide means extending from said other side bar over the detector rods toward said one side bar, said support means and guide means having aligning grooves receiving the detector rods for sliding movement thereof relatively to the elements, and means to secure said elements together.

4. In a weft detector having a pair of slidable electric detector rods each having a shoulder urged rearwardly by a spring engaging the shoulder, a pair of detector base forming elements between which the detector rods extend, a back arm on one of said elements extending under said rods, a back arm on said other element extending over said rods, removable means normally holding said arms together, a front arm on said one element extending under the rods, a second front arm extending from said other element over the rods, and removable means normally holding said front arms together, the springs on said rod extending between said front and back arms and said shoulders engaging the back arms, and said front and back arms having provision for guiding said detector rods for sliding movement between them and relatively to the elements.

5. In a weft detector having a pair of slidable electric detector rods each having a shoulder urged rearwardly by a spring engaging the shoulder, a pair of detector base forming elements between which the rods extend, front and back support means on one of said elements extending under said rods, front and back guide means extending from said other element over the detector rods, each spring normally holding the corresponding shoulder against the back support and back guide means, said detector rods located between the front guide and front support means and also between the back guide and back support means, said springs normally engaging the front support and front guide means, removable means connecting said back support and back guide means together, and other removable means connecting the front support and front guide means together.

6. A base forming element for an electrical weft detector operating with a pair of detector rods each having a shoulder, said base forming element having a side bar provided with laterally extending front and back arms, each of said arms having spaced guide grooves, said element and arms being so related that when a second similar element is inverted and secured to the first element with its arms overlying the arms of the first element the two elements jointly form a base with the grooves aligned to guide the detector rods.

7. A weft detector base forming element having a side bar provided with front and back arms extending laterally therefrom, said arms having spaced parallel detector rod receiving grooves therein, said element being so constructed that when a second similar element is inverted and secured thereto with the arms thereof disposed over the arms of the first element the two elements will form a detector base having aligned grooves in which the detector rods are slidable.

8. In an electrical weft detector having two slidably mounted current conducting detector members the rear parts of which are guided for sliding movement on the detector, coil springs, one for each member, through which the forward ends of said members extend, said coil springs being made of resilient current conducting material and each having a lateral extension held to the detector, and means to deflect the axis of each coil spring to insure contact thereof with the corresponding member.

9. In an electric weft detector having a base in which a pair of current conducting detector members are mounted for sliding movement, a resilient electric current conducting coil spring surrounding each member and carried by the base, a binding post securing each coil spring to the base, and means carried by the base for deflecting the axis of each coil spring to insure electric contact of the latter with the corresponding member.

10. In a slide bearing for an elongated electric detector member of a weft detector, said slide bearing comprising a base formed of electric insulating material, a resilient electric current conducting coil spring carried by the base and through which the detector member extends, and means carried by the base for deflecting the axis of the spring to insure electric contact between the member and spring.

11. In a slide bearing for an elongated electric detector member of a weft detector, said slide bearing means comprising a base formed of electric insulating material, a resilient electric current conducting coil spring mounted in the base and surrounding the detector member and capable of lateral deflection relatively to the latter, and means carried by the base to deflect said spring laterally to insure contact between the detector member and the interior of the coils of said spring.

12. In an electric weft detector for a loom having a stand, the detector having two spaced electric detector rods, a pair of similar detector base forming elements on the stand, removable means securing each element to the stand, support means extending from one of said elements under said detector rods, guide means on the other element extending over said detector rods, removable means securing said support means and said guide means together with the rods located between said support means and guide means, said other element being removable from the stand independently of said one element while the latter is on said stand, said one element supporting said detector rods when said other element is absent.

13. In an electrical weft detector for a loom having a stand and operating with a pair of spaced electrical detector rods, a detector base forming element on one side of said detector rods, means securing said element to the stand, support means extending from said element under said detector rods, a second detector base forming element located on the other side of said rods, removable means securing the second element to said stand, guide means on the second element extending over the detector rods, and removable means securing the support means to the guide means, the detector rods being supported by the first named element when the second named element is removed from the support, and said guide means and said support means having provision for cooperating with each other to provide guides for the detector rods.

RICHARD G. TURNER.